(12) United States Patent
Nickel

(10) Patent No.: US 6,239,364 B1
(45) Date of Patent: May 29, 2001

(54) WIRE-MESH CABLE TROUGH

(75) Inventor: Wilfried Nickel, Menden (DE)

(73) Assignee: Otto Bettermann GmbH & Co. KG, Menden (DE)

( * ) Notice: Subject to any disclaimer, the term of this patent is extended or adjusted under 35 U.S.C. 154(b) by 0 days.

(21) Appl. No.: 09/347,638

(22) Filed: Jul. 6, 1999

(30) Foreign Application Priority Data

Jul. 11, 1998 (DE) .............................. 198 31 145

(51) Int. Cl.⁷ .................................................. H02G 3/04
(52) U.S. Cl. ................................................. 174/48; 174/49
(58) Field of Search ................................. 174/19, 48, 49, 174/60; 248/41, 49, 58; 254/389; 379/38; D13/155

(56) References Cited

U.S. PATENT DOCUMENTS

| | | | |
|---|---|---|---|
| D. 322,596 | * | 12/1991 | Henneberger ........................ D13/155 |
| 5,067,678 | * | 11/1991 | Henneberger et al. ................ 248/58 |
| 5,531,410 | * | 7/1996 | Simon .................................... 248/49 |
| 5,927,658 | * | 7/1999 | Gester .................................... 248/49 |
| 6,037,538 | * | 3/2000 | Brooks .................................... 174/68 |
| 6,082,690 | * | 6/2000 | Durin et al. ........................... 248/241 |

FOREIGN PATENT DOCUMENTS 690 14 509   8/1995 (DE) .
693 04 416   4/1997 (DE) .

* cited by examiner

*Primary Examiner*—Dean A Reichard
*Assistant Examiner*—Angel R. Estrada
(74) *Attorney, Agent, or Firm*—Herbert Dubno; Andrew Wilford

(57) ABSTRACT

A cable-guide trough has a row of like U-shaped cross bars aligned with one another and lying in respective generally parallel and longitudinally spaced planes and a plurality of generally parallel longitudinal bars joined to the cross bars and each having a first laterally deflected end portion carrying a first one of the cross bars and an opposite second end portion carrying a second one of the cross bars. The first cross bar and the first end portions are dimensioned to nest with the second the cross bar and second end portions of another such trough to couple the troughs together.

10 Claims, 6 Drawing Sheets

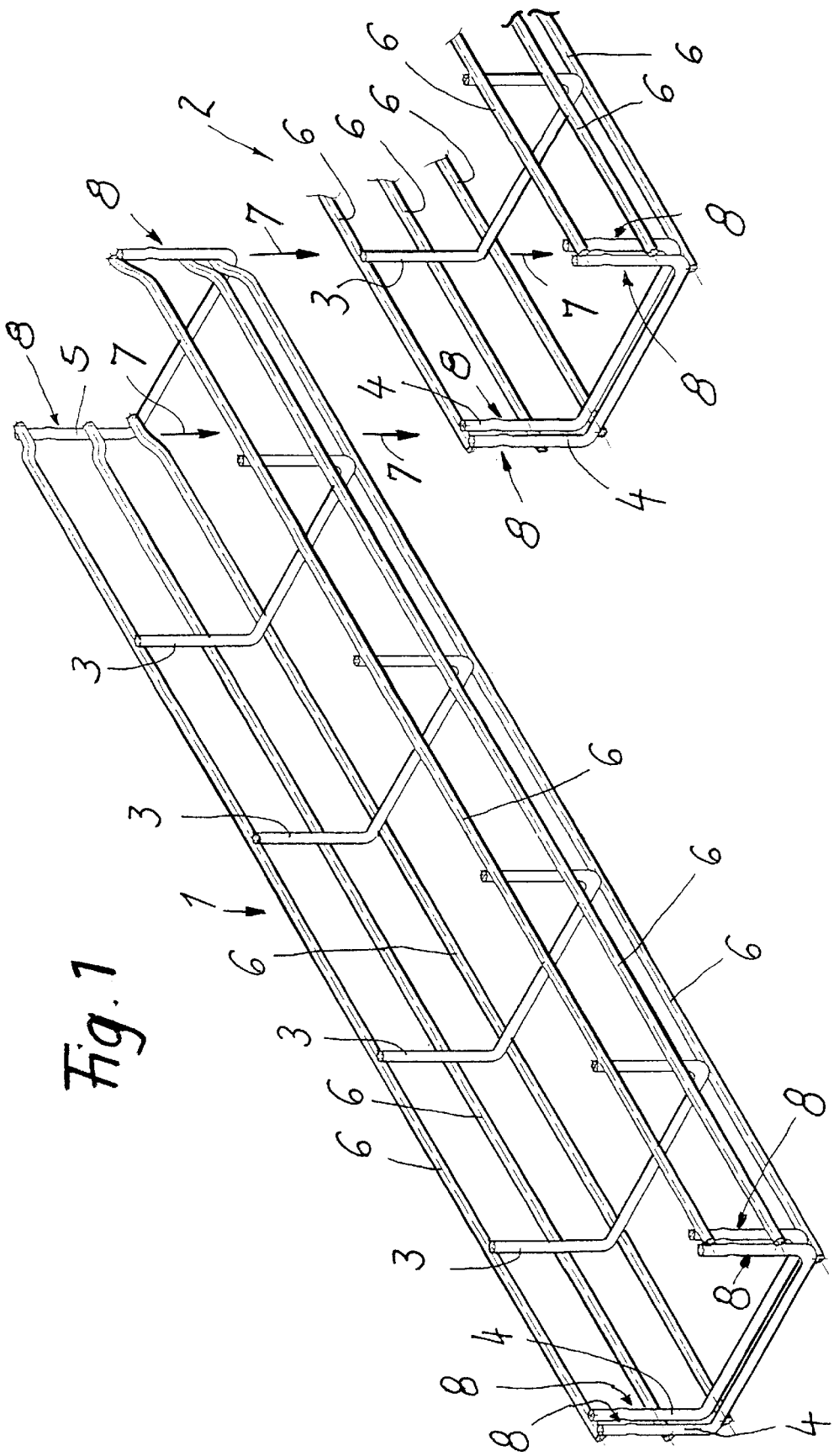

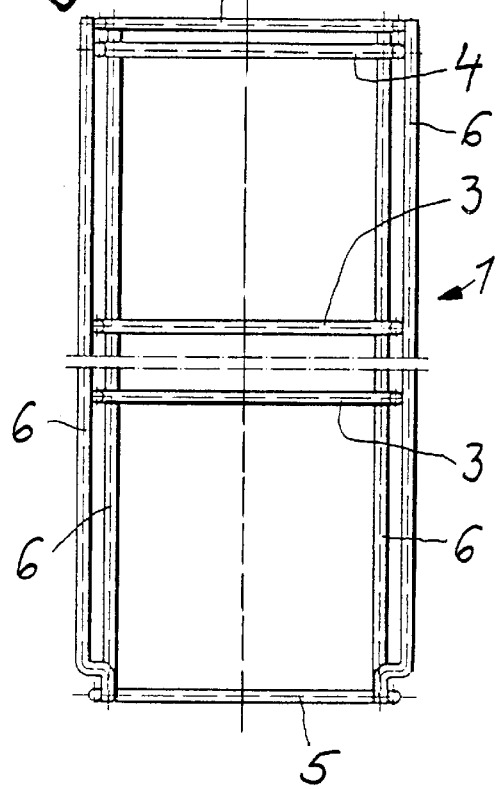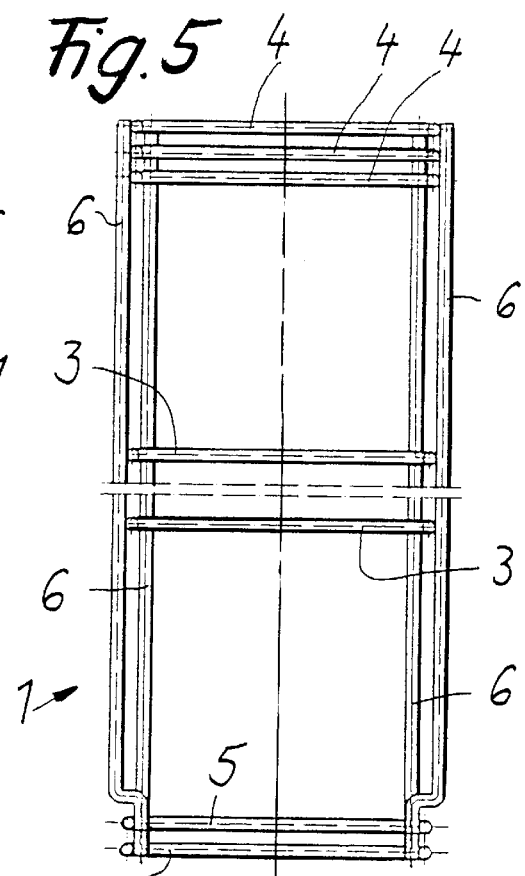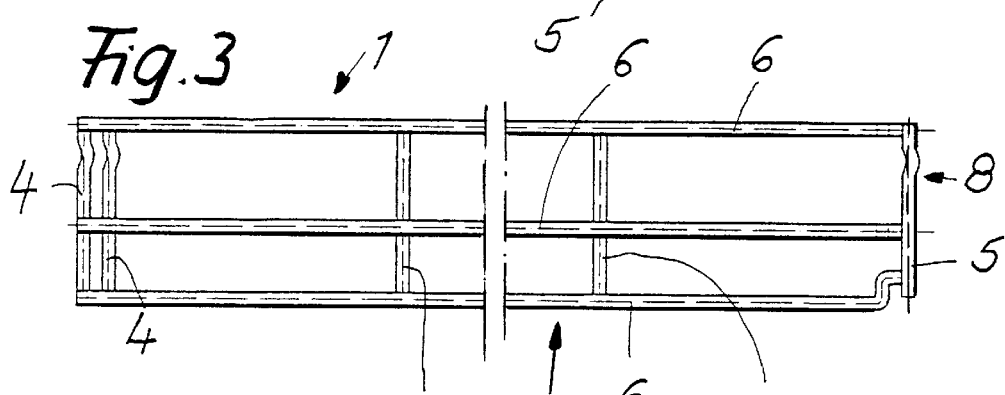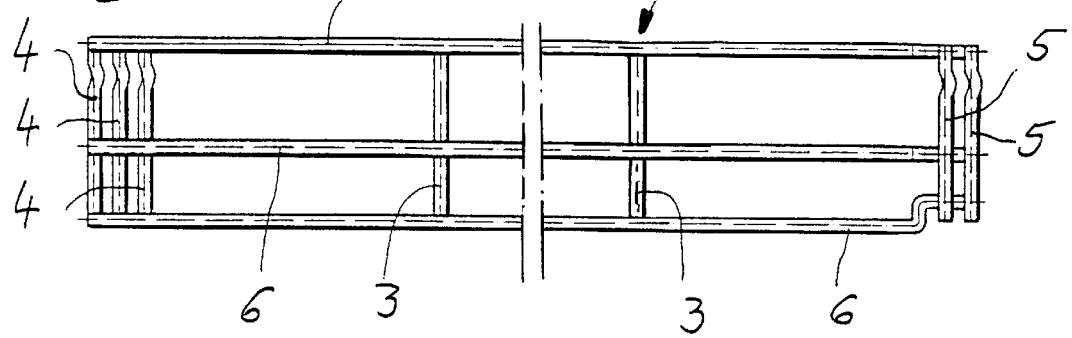

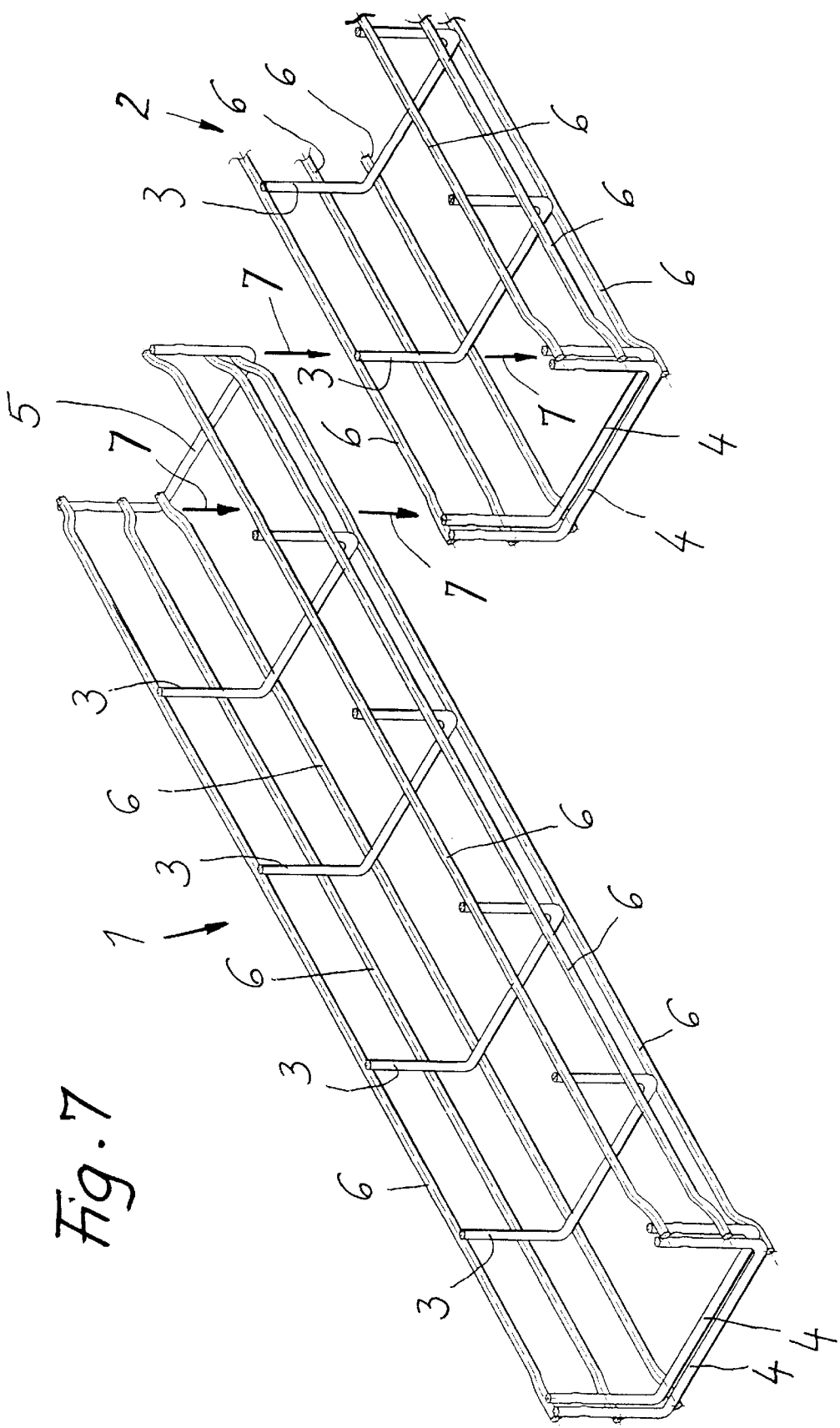

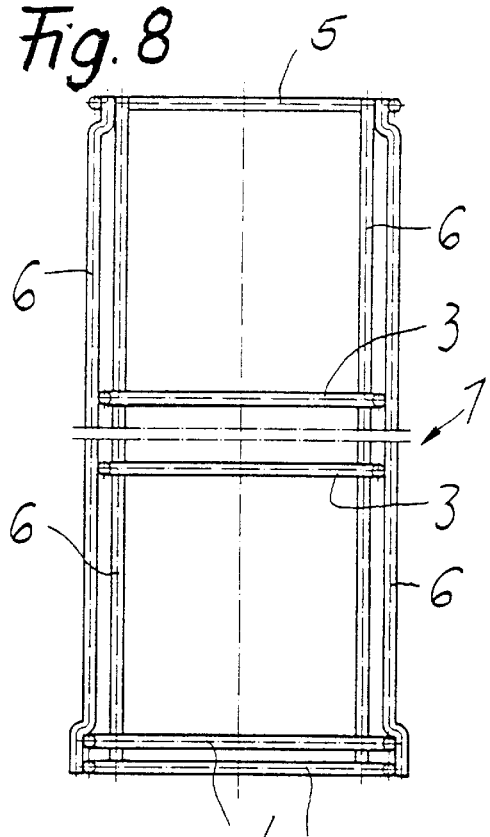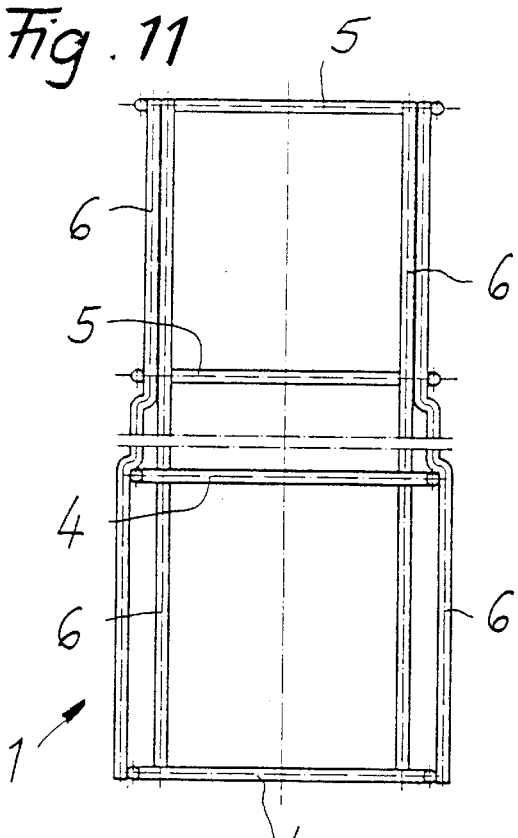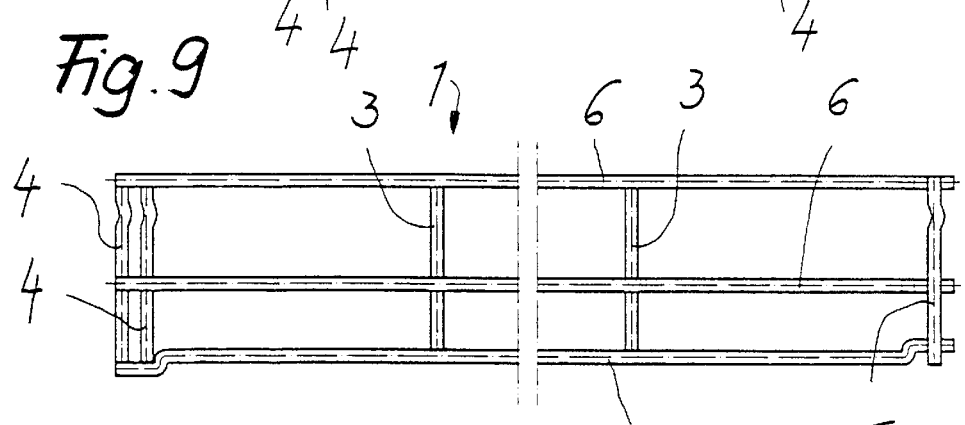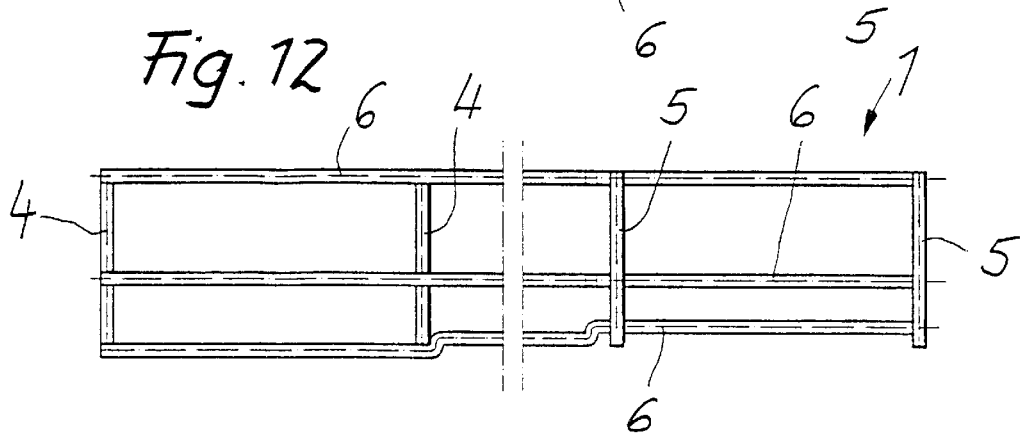

WIRE-MESH CABLE TROUGH

FIELD OF THE INVENTION

The present invention relates to a guide trough for cables. More particularly this invention concerns such a trough made modularly of wire mesh.

BACKGROUND OF THE INVENTION

Wire-mesh troughs are typically used to hold wires and cables in such a manner that they are solidly supported yet readily accessible. Thus it is standard to provide such troughs adjacent the ceiling in computer rooms and the like.

The typical trough is made of a plurality of relatively stiff longitudinal rods and at least two crosswise U-shaped rods to which they are welded, for instance with four longitudinal rods at the base of the U-shaped cross rod and two more longitudinal rods forming sides of the trough and secured to the up-wardly pointing arms of the cross rods. Of course angled troughs are provided for going around corners and changing levels and T- or X-shaped troughs are provided for forming intersections where several such troughs are joined together.

All these wire-mesh structures typically end at a standardized U-shaped end defined by a single cross rod and the ends of the longitudinal rods. This makes it possible to join the various structures together into any shape, achieving a relatively good custom fit.

To this end the structures to be joined are typically butted endwise and secured together with clips. As described in commonly owned U.S. patent application Ser. No. 09/159,486 a clip is used with a pair of wire troughs having a cross U-shaped end rod of predetermined diameter joined to ends of longitudinal rods. The clip is U-shaped and engaged around the end rods between a respective pair of the longitudinal rods. It has a floor engaging the two end rods and is formed with a pair of flanks each engaging a respective one of the ends rods and each formed with a respective formation retaining the respective end rod against the floor. A similar clip-connecting system is described in German patent document 690 14 509. The disadvantage of these systems is that these separate clips not only constitute a separate element that needs to be manufactured and provided with the troughs, but they can get lost or knocked loose, making it impossible to join the troughs together.

As described in German patent document 693 04416 it is also known to provide separate connector bars on the sides of the troughs that project from one end and can be slipped around the cross bars of another trough to join two such troughs together. These bars have the advantage that they are fixed on the troughs so they cannot get lost or come loose. Nonetheless they add to the manufacturing costs of the troughs and create a clear and unattractive demarcation between adjacent troughs. Furthermore at the end of the trough it is necessary to leave the clips protruding, producing an unattractive appearance, or to break them off which is an extra step and also often results in a rough broken end.

OBJECTS OF THE INVENTION

It is therefore an object of the present invention to provide an improved wire-mesh cable trough.

Another object is the provision of such an improved wire-mesh cable trough which overcomes the above-given disadvantages, that is which is easy to join together without the use of extra parts and that creates an attractive and neat assembly when joined together.

SUMMARY OF THE INVENTION

A cable-guide trough has according to the invention a row of like U-shaped cross bars aligned with one another and lying in respective generally parallel and longitudinally spaced planes and a plurality of generally parallel longitudinal bars joined to the cross bars and each having a first laterally deflected end portion carrying a first one of the cross bars and an opposite second end portion carrying a second one of the cross bars. The first cross bar and the first and portions are dimensioned to nest with the second the cross bar and second end portions of another such trough to couple the troughs together.

Thus with this system no separate clips or structure are provided. Instead the narrow end of one trough is simple fitted crosswise to the wider end of another such trough to lock the two together, completely without the use of any separate parts or tools.

According to the invention the trough has two such first cross bars spaced longitudinally apart by a distance equal generally to a diameter of the second cross bar so that the second cross bar of one trough can fit between the first bars of another such trough. It can also have has three such first cross bars and two such second cross bars spaced longitudinally apart by a distance equal generally to a diameter of the cross bars so that the second cross bars of one trough can fit between the first bars of another such trough.

Normally in accordance with the invention all the cross bars except the first cross bar are mounted inside the longitudinal bars. The first cross bar is mounted outside the laterally deflected first end portions of the longitudinal bars. In addition all the rods are of substantially the same diameter and the first end portions are deflected laterally by a distance equal substantially to the diameter.

The first end portions according to the invention can be deflected outward and the second end portions inward. Alternately the first end portions can be deflected inward and the second end portions outward. In the latter case all the rods are of substantially the same diameter and the first end portions are deflected inward by a distance equal substantial to half the diameter and the second end portions are deflected outward by a distance also equal substantially to half the diameter. The term "inward" here means that the end portions of the bars of the floor of the trough are offset upward but parallel to the longitudinal centerline of the trough and the end portions of the bars of the sides are offset inward toward each other.

In another arrangement according to the invention all of the cross bars are spaced generally uniformly and the first end portions carry two such first cross bars and the second end portions carry two such second cross bars. This ensures a substantial overlap at the connection region for a very rigid connection.

The first and second cross bars are formed with formations that fit together on engagement of a first cross bar of one trough with a second cross bar of another trough. Thus the two troughs can be clicked or snapped together to form an assembly that is unlikely to come apart in normal use.

BRIEF DESCRIPTION OF THE DRAWING

The above and other objects, features, and advantages will become more readily apparent from the following description, reference being made to the accompanying drawing in which:

FIG. 1 is a perspective view showing two troughs according to the invention;

FIGS. 2 and 3 are top and side views of the trough according to FIG. 1;

FIGS. 5 and 6 are top and side views of the trough according to FIG. 4;

FIG. 7 is a perspective view of a third trough assembly according to the invention;

FIGS. 8 and 9 are top and side views of the trough according to FIG. 7;

FIGS. 11 and 12 are top and side views of the trough according to FIG. 10.

SPECIFIC DESCRIPTION

Figure 4:
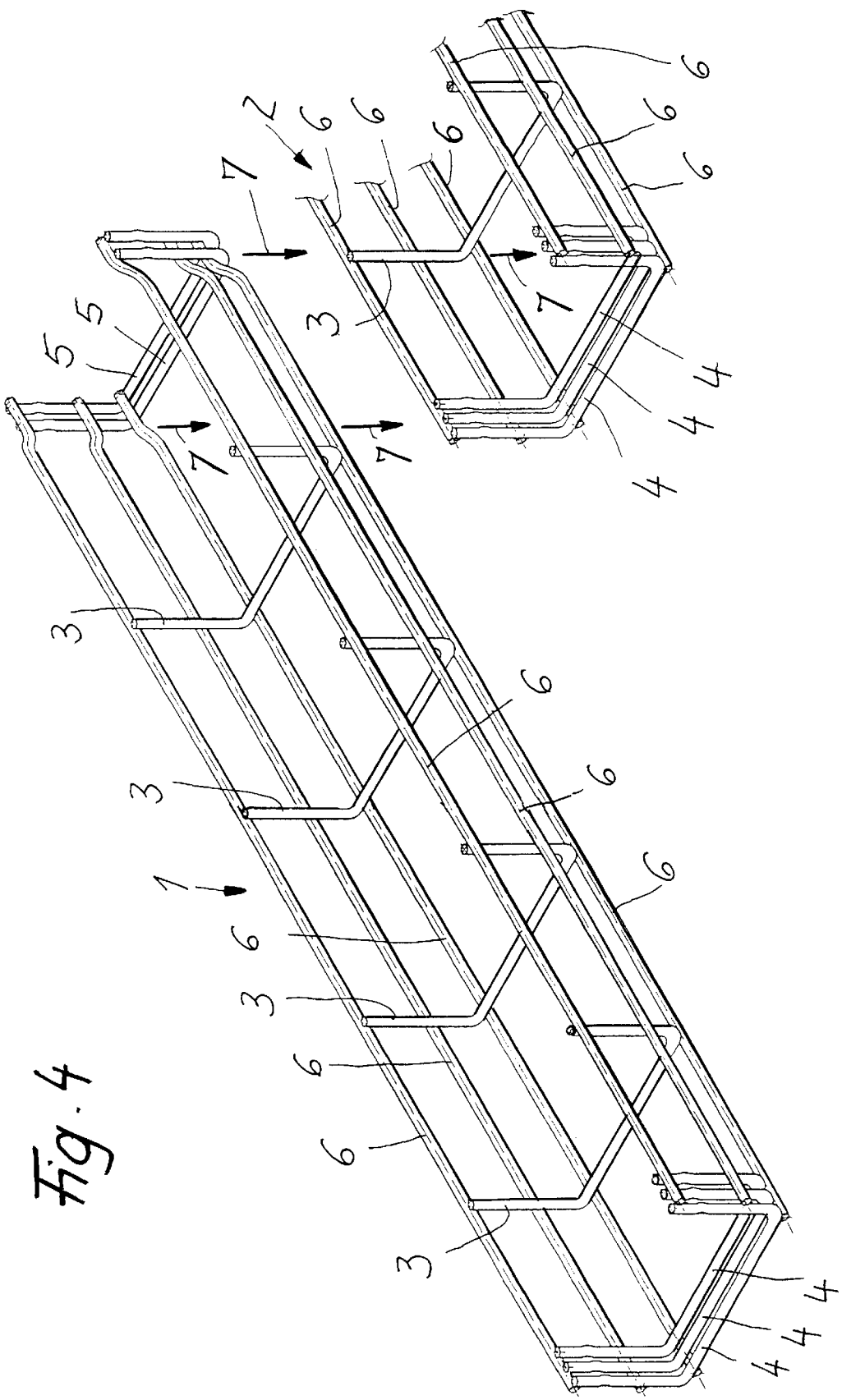
FIG. 4 is a perspective view of a second trough assembly according to the invention.

An seen in FIGS. 1 to 3, a plurality of identical troughs 1 and 2 according to the invention are each formed of U-shaped cross bars 3, 4, and 5 and longitudinal bars 6, with two such bars 6 along each arm of each cross bar 3, 4, or 5, and two more along the bight of each such cross bar 3, 4, or 5. These bars 3–6 are all normally made of stiff steel wire and may be enameled or coated with plastic and are welded together where they intersect.

According to the invention two of the cross bars 4 are provided inside the longitudinal bars 6 at one end of the troughs 1 and 2, spaced longitudinally apart by a distance equal to their diameters. At the opposite end the end cross bar 5 is slightly smaller, the longitudinal bars 6 are bent inward at ends 8, and the bar 5 is mounted outside the bent-in ends 8 of the longitudinal bars 6. The intermediate cross bars 3 are of the same size and shape as the cross bars 4 and are uniformly spaced in parallel planes along the troughs 1 and 2 and fastened inside the longitudinal bars 6.

Furthermore the cross bars 4 and 5 and the bent-in ends 8 form latching formations that snap together when the troughs 1 and 2 are engaged together. Each such lateral U-bend therefore forms a bump on one side and a seat on the other for complementary interfitting with a similar formation on another end cross bar 4 or 5.

It is therefore possible to fit the narrow end of the trough 1 with the bar 5 into the wide end of the trough 2 with the bars 4 as indicated by arrows 7. The bar 5 will fit between the bars 4 and will solidly lock the two troughs 1 and 2 together. The end cross bars 4 and 5 deform elastically somewhat to allow the formations 8 to snap together and retain the two troughs 1 and 2 locked together.

The system of FIGS. 4 to 6 is the same as that of FIGS. 1 to 3 except that three end cross bars 4 are provided at the one end and two end cross bars 5 at the other, spaced apart by a rod diameter. Thus the two bars 5 will be snugly engaged between the three bars 4 for a very solid connection.

In the arrangement of FIGS. 7 to 9 the ends of the longitudinal bars 6 carrying the cross bars 4 are bent out. The outward deflection can be half a rod diameter as can be the inward deflection of the ends of the rods 6 carrying the cross bar 5 so that the rods 5 will still nest perfectly between the rods 4, but the overall contours of the finished assembled trough will be somewhat smoother.

Figure 10:
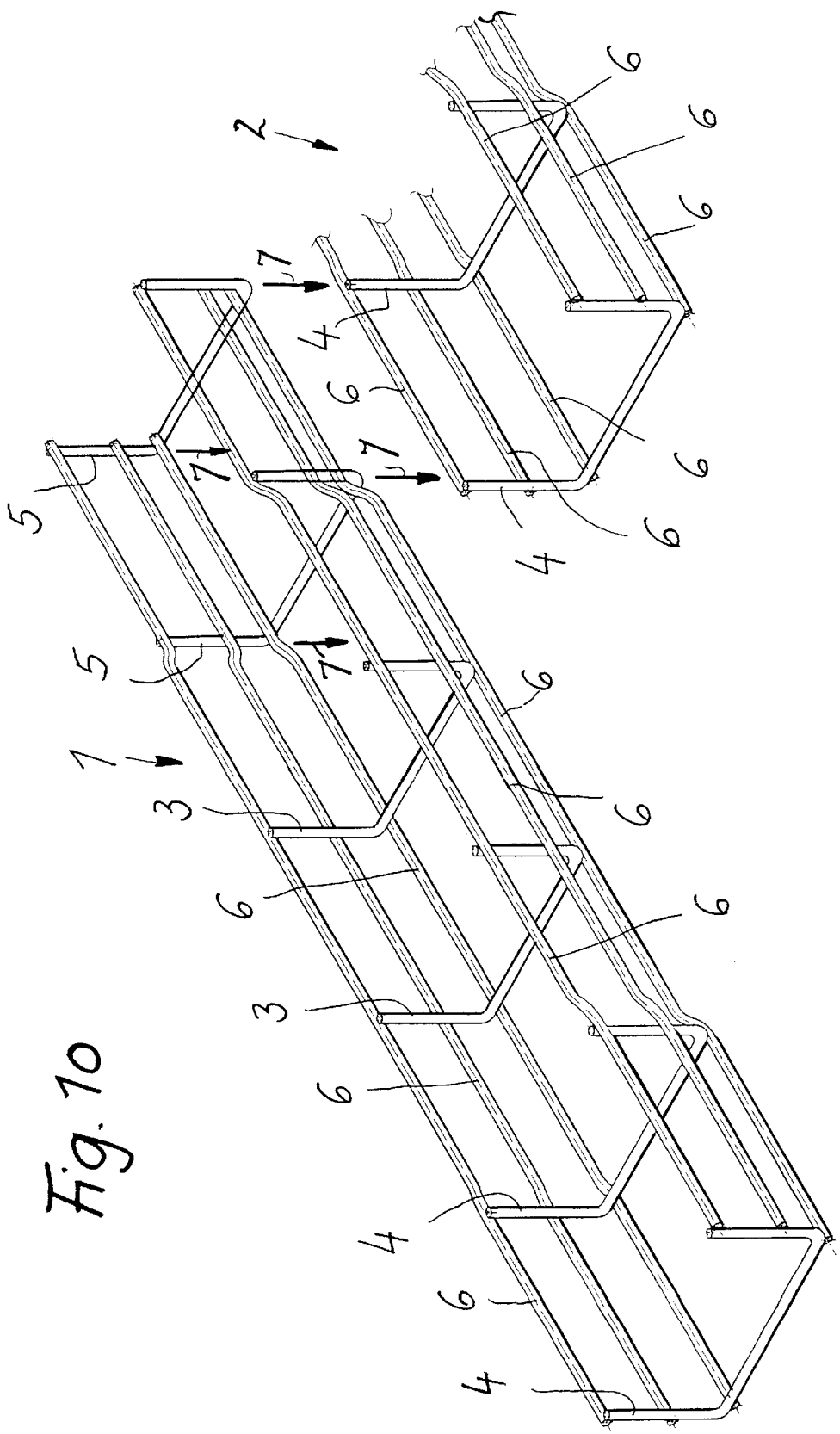
FIG. 10 is a perspective view of a fourth trough assembly according to the invention.

The troughs 1 and 2 of FIGS. 10 to 12 have the same half-diameter offset or deflection of the longitudinal rods 6 at both ends, but over a substantially greater length. The cross-bars 3, 4, and 5 are uniformly longitudinally spaced and the inward and outward deflection extends over this spacing. The two end bars 5 are slightly more closely spaced than the other bars 3 and 4 and/or the two end bars 4 are more closely spaced than the other bars 3 and 5 so that the troughs 1 and 2 are fitted together to overlap over a distance equal to the spacing between adjacent cross bars. This makes the system quite rigid and capable of spanning considerable distances.

I claim:

1. A cable-guide trough comprising:

a row of like U-shaped cross bars aligned with one another and lying in respective generally parallel and longitudinally spaced planes; and a plurality of generally parallel longitudinal bars joined to the cross bars and each having a first laterally deflected end portion carrying a first longitudinally spaced pair of the cross bars and an opposite second end portion carrying a second one of the cross bars, the two first cross bars being spaced longitudinally apart by a distance equal to a diameter of the second cross bar, the first cross bars and the first end portions being dimensioned to nest with the second one of the cross bars and second end portions of another such trough to couple the troughs together.

2. The trough defined in claim 1 wherein the trough has three such first cross bars and two such second cross bars spaced longitudinally apart by a distance equal generally to a diameter of the cross bars, whereby the second cross bars of one trough can fit between the first bars of another such trough.

3. The trough defined in claim 1 wherein the first end portions are deflected inward.

4. The through defined in claim 1 wherein the first end portions are deflected outward.

5. The trough defined in claim 1 wherein the first end portions are deflected inward and the second end portions are deflected outward.

6. The trough defined in claim 1 wherein the first and second cross bars are formed with formations that fit together on engagement of a first cross bar of one trough with a second cross bar of another trough.

7. A cable-guide trough comprising:

a row of like U-shaped cross bars aligned with one another and lying in respective generally parallel and longitudinally spaced planes; and a plurality of generally parallel longitudinal bars joined to the cross bars and each having a first laterally deflected end portion carrying a first one of the cross bars and an opposite second end portion carrying a second one of the cross bars, the first one of the cross bars and the first end portions being dimensioned to nest with the second one of the cross bars and second end portions of another such trough to couple the troughs together, all the cross bars except the first cross bar being mounted inside the longitudinal bars, the first cross bar being mounted outside the laterally deflected first end portions of the longitudinal bars.

8. The trough defined in claim 7 wherein all the rods are of substantially the same diameter and the first end portions are deflected laterally by a distance equal substantially to the diameter.

9. A cable-guide trough comprising:

a row of like U-shaped cross bars aligned with one another and lying in respective generally parallel and longitudinally spaced planes; and a plurality of generally parallel longitudinal bars joined to the cross bars and each having a first laterally deflected end portion carrying a first one of the cross bars and an opposite second end portion carrying a second one of the cross bars, the first one of the cross bars and the first end portions being dimensioned to nest with the second one of the cross bars and second end portions of another such trough to couple the troughs together, all the rods being of substantially the same diameters, the first end portions being deflected inward by a distance equal substantial to half the diameter and the second end portions being deflected outward by a distance also equal substantially to half the diameter.

10. The trough defined in claim 9 wherein all of the cross bars are spaced generally uniformly and the first end portions carry two such first cross bars and the second end portions carry two such second cross bars.

* * * * *